(12) United States Patent
Gao et al.

(10) Patent No.: US 8,545,803 B2
(45) Date of Patent: Oct. 1, 2013

(54) MODIFIED MOLECULAR SIEVE CHARACTERIZED BY IMPROVED SODIUM-CONTAMINATION-RESISTING ACTIVITY AND PREPARATION METHOD THEREOF

(75) Inventors: Xionghou Gao, Lanzhou (CN); Dong Ji, Lanzhou (CN); Haitao Zhang, Lanzhou (CN); Hongchang Duan, Lanzhou (CN); Di Li, Lanzhou (CN); ZhengGuo Tan, Lanzhou (CN); Yi Su, Lanzhou (CN); Chenxi Zhang, Lanzhou (CN); Yi Wang, Lanzhou (CN); Yanqing Ma, Lanzhou (CN); Yanbo Sun, Lanzhou (CN)

(73) Assignee: PetroChina Company Limited (CN)

( * ) Notice: Subject to any disclaimer, the term of this patent is extended or adjusted under 35 U.S.C. 154(b) by 0 days.

(21) Appl. No.: 13/505,224

(22) PCT Filed: Dec. 1, 2009

(86) PCT No.: PCT/CN2009/001352
§ 371 (c)(1),
(2), (4) Date: Apr. 30, 2012

(87) PCT Pub. No.: WO2011/050504
PCT Pub. Date: May 5, 2011

(65) Prior Publication Data
US 2012/0213695 A1 Aug. 23, 2012

(30) Foreign Application Priority Data

Oct. 30, 2009 (CN) .......................... 2009 1 0237006

(51) Int. Cl.
*C01B 39/00* (2006.01)
*C01F 7/00* (2006.01)
(52) U.S. Cl.
USPC ........................ 423/700; 423/711; 423/713

(58) Field of Classification Search
USPC ................................................. 423/700–718
See application file for complete search history.

(56) References Cited

U.S. PATENT DOCUMENTS 3,702,886 A 11/1972 Argauer et al.
3,965,208 A * 6/1976 Butter et al. .................. 585/454

(Continued)

FOREIGN PATENT DOCUMENTS

CN 85102828 A 7/1986
CN 1217231 A 5/1999

(Continued)

OTHER PUBLICATIONS

"International Application No. PCT/CN2009/01352, International Search Report mailed Mar. 18, 2010", 8 pgs.

*Primary Examiner* — Bijay Saha
(74) *Attorney, Agent, or Firm* — Schwegman Lundberg & Woessner, P.A.

(57) ABSTRACT

Modified molecular sieve characterized by improved sodium-resisting contamination activity and preparation method thereof are provided. The method comprises: adding molecular sieve in phosphorus-containing organic solution, and reacting for 10-200 minutes at temperature of 70-200° C. and pressure of 0.2-1.2 MPa, and then filtering, drying and calcining. The said modified molecular sieve contains 90-99 wt. % molecular sieve as dry basis and 1-10 wt. % phosphorus as oxide. The said method can improve the capability of sodium-resisting contamination effectively, and its technology is simple and fits the existing catalyst production apparatus and process. The said modified molecular sieve has high sodium-resisting contamination activity, and the model catalyst by sodium contamination has high activity retention.

9 Claims, No Drawings

(56) References Cited

U.S. PATENT DOCUMENTS

| | | |
|---|---|---|
| 3,972,383 A | 8/1976 | Green |
| 4,399,059 A | 8/1983 | Chu |
| 5,171,921 A | 12/1992 | Gaffney et al. |
| 5,997,728 A | 12/1999 | Adewuyi et al. |
| 6,350,429 B1 * | 2/2002 | Murrell et al. ............... 423/712 |
| 6,395,949 B1 * | 5/2002 | Drake et al. ............... 585/651 |
| 2007/0209969 A1 * | 9/2007 | Shen et al. ............... 208/133 |
| 2010/0260665 A1 * | 10/2010 | Archer et al. ............... 423/706 |

FOREIGN PATENT DOCUMENTS

| | | |
|---|---|---|
| CN | 1872415 A | 12/2006 |
| CN | 101537365 A | 9/2009 |

* cited by examiner

MODIFIED MOLECULAR SIEVE CHARACTERIZED BY IMPROVED SODIUM-CONTAMINATION-RESISTING ACTIVITY AND PREPARATION METHOD THEREOF

PRIORITY CLAIM TO RELATED APPLICATIONS

This application is a national stage application under 35 U.S.C. §371 of PCT/CN2009/001352, filed Dec. 1, 2009, and published as WO 2011/050504 A1 on May 5, 2011, which claims priority to Chinese Application No. 200910237006.X, filed Oct. 30, 2009, which applications and publication are incorporated herein by reference and made a part hereof in their entirety, and the benefit of priority of each of which is claimed herein.

TECHNICAL FIELD OF THE INVENTION

The present invention belongs to the technical field of molecular sieve preparation, and in particular relates to a modified molecular sieve with improved sodium-resisting contamination activity and the preparation method thereof.

BACKGROUND ART OF THE INVENTION

In recent years, the domestic and international researchers and producers in the field of refining catalysts has devoted themselves to improve the performance of FCC catalyst by means of molecular sieves with various types of structure in order to increase the yields of light olefins in FCC plants. This is because the primary process for traditional production of ethylene and propylene, i.e. steam pyrolysis, is performed by the free radical reactions, wherein the temperature is high and the requirement to feedstock is rigorous. In contrast, catalytic pyrolysis for producing light olefins has relatively lower cost and is the hot spot in the domestic and international research for increasing light olefin capacity. Functionalized shape-selective molecular sieves deserve wide attention as the major active constituent in such kind of catalytic converting catalyst.

Since USA Mobil Company has developed the ZSM-5 zeolite molecular sieve (U.S. Pat. No. 3,702,886) in 1972, it has been widely applied in petrochemical processes, such as shape-selective cracking (CN 1872415A), alkylation, isomerisation, disproportionation, catalytic dewaxing, etherification and etc. of hydrocarbons, due to its properties of relatively high silica to alumina ratio, unique pore structure, and excellent thermal and hydrothermal stabilities. In particular, adding ZSM-5 zeolite into normal catalysts or aids for catalytic cracking enables to significantly increase the yields of light olefins and the octane number (U.S. Pat. No. 5,997,728).

In the composition of modern FCC catalysts, the molecular sieve active constituent may significantly affect the comprehensive reaction performance of the catalyst. In general, besides a portion of shape-selective zeolite molecular sieve ZSM-5, a FCC catalyst further contains 30-40% by weight of Y type zeolite, which comprises REY, USY, REUSY and REHY, and other types of molecular sieves as the primary active constituent in the FCC catalyst. However, the sodium content in Y type zeolites are much more higher than that in H-ZSM-5 molecular sieves, while the active centers of the H-ZSM-5 molecular sieve are very readily to be covered by sodium ions via ion exchange in the presence of sodium ions. Therefore, during the preparation of FCC catalyst, the H-ZSM-5 molecular sieve is very readily to be contaminated by sodium ions from the environment and thus deactivated, and thus its catalytic cracking activity and selectivity will be affected. The research about increasing the sodium-resisting contamination activity of ZSM-5 molecular sieves has not been reported at present.

At present, a number of researches have been performed about various methods for modifying phosphorus-modified ZSM-5 zeolite molecular sieves, which are mainly applied in petrochemical processes, such as shape-selective cracking, alkylation, isomerisation, disproportionation, catalytic dewaxing, etherification and etc. of hydrocarbons.

In U.S. Pat. No. 4,399,059, diammonium hydrogen phosphate or ammonium dihydrogen phosphate is mixed with $NH_4$-ZSM-5 and dried, and the mixture is calcined at 500° C. so as to produce a phosphorus-modified ZSM-5 zeolite, which makes it possible to significantly improve the selectivity of para isomer product when used in the isomerisation reaction of xylene.

U.S. Pat. No. 5,171,921 discloses a ZSM-5 molecular sieve modified by impregnating with phosphorus compounds. Such modified molecular sieve may be used as the catalytically active constituent that converts olefins or aliphatic hydrocarbons into $C_2$-$C_5$ olefins.

U.S. Pat. No. 3,972,382 and U.S. Pat. No. 3,965,208 disclose that the reaction selectivity of the HZSM-5 is improved after being modified with trimethyl phosphite.

CN 85102828 reports modifying the ZSM-5 molecular sieve using a method by impregnating and evaporating, and the phosphorus-modified molecular sieve has a substantially improved activity in the shape-selective catalysis for preparing para-ethyltoluene by alkylation of toluene with ethylene.

CN 97120271 reports a phosphorus-containing faujasite as hydrocarbon cracking catalyst, said phosphorus-containing faujasite is prepared by uniformly mixing faujasite with an aqueous solution of a phosphorus-containing compound followed by drying and calcining at 450-600° C. for more than 0.5 h, and has a relatively good catalytic activity.

However, according to the research about the sodium-resisting contamination activity of H-ZSM-5 zeolite molecular sieves after conventional phosphorus modification, it has been founded that the molecular sieve after conventional phosphorus modification will loss plenty of modifying constituent in the molecular sieve, and a number of sodium ions will exist on surface of the molecular sieve via ion exchange, that is, it does not possess sodium-resisting contamination activity.

SUMMARY OF THE INVENTION

The purpose of the present invention consists in providing a modified molecular sieve with improved sodium-resisting contamination activity and the preparation method thereof.

A modified molecular sieves with improved sodium-resisting contamination activity and the preparation method thereof, characterized in that, a molecular sieve is added to a phosphorus-containing organic solution and allowed to react at a reaction temperature of 70-200° C. (preferably 90-160° C.) under a reaction pressure of 0.2-1.2 MPa (preferably 0.2-0.8 MPa) for 10-200 minutes, followed by filtering, drying and calcining, so as to obtain a modified molecular sieve.

In the method provided by the present invention, the filtering, drying and calcining during the modification all employ the processes and technical parameters that are commonly used in prior art, in another words, there is no particular limitation in the present invention, and it is recommended that the drying temperature is in the range of 100-120° C., the calcining temperature is in the range of 200-800° C. and the calcining time is in the range of 0.5-10 h.

The modification condition of the present invention differs from that of the conventional modification method, and consists in high temperature while a certain pressure is involved. The diffusion of modifying constituents in pores of the molecular sieve can be further enhanced by the synergy of the high temperature and of pressurization, which enables the modifying constituents to enter deeper pores within the molecular sieve and react with the B acid sites on the surface thereof. Such a satisfying effect can not be achieved when the high temperature is solely applied without pressurization or else the pressurization is carried out at low temperature. There is no particular limitation for the type of the molecular sieve, which can result in a phosphorus modified molecular sieve by using such method. HZSM-5 is the particularly recommended molecular sieve in the present invention. Because ZSM-5 molecular sieves have certain degree of hydrophobicity, employing organic solvent as medium is benefit for the modifying constituent to diffuse in the molecular sieve. The inventor has discovered upon research that the ZSM-5 zeolite molecular sieve modified with phosphorus by using the method of the present invention has increased the sodium-resisting contamination activity. The introduction of phosphorus effectively inhibits the sodium ions from contaminating the ZSM-5 molecular sieve and protects the catalytic active centers of the ZSM-5 molecular sieve, and thus the catalytic cracking activity of ZSM-5 molecular sieve is significantly increased.

The molecular sieve in accordance with the present invention is preferably HZSM-5 molecular sieve with a preferred silica to alumina ratio in the range of 15-300.

In the method provided by the present invention, the phosphorus-containing compound that is soluble in organic solution is one or more selected from the group consisting of triethyl phosphate, trimethyl phosphite, triethyl phosphite, tributyl phosphate, triphenyl phosphate, phosphorus trichloride, phosphorus tribromide, phosphorus pentachloride and di-n-butyl phosphite, and preferably triethyl phosphate, trimethyl phosphite and triethyl phosphite.

The organic solvent in accordance with the present invention is an organic solvent that is able to dissolve the phosphorus-containing compound, and mainly being one of n-hexane, n-pentane, isopentane, cyclopentane, ethyl ether, ethanol, acetone, toluene and carbon tetrachloride, preferably n-hexane, n-pentane and isopentane. The weight ratio of the phosphorus-containing organic solution to the molecular sieve is preferably in the range from 2:1 to 6:1.

The present invention also provides a modified molecular sieve obtained by using the modification method of the present invention. The particularly recommended composition of the modified molecular sieve of the present invention is as follows: 90-99% by weight on a dry basis of a molecular sieve with a silica to alumina ratio of 15-300, and 0.5-10% by weight on an oxide basis of phosphorus, all of the above percentages being based on the weight of the composition.

DETAILED DESCRIPTION OF THE INVENTION

The analysis methods in each examples and comparative examples are as follows:
1. The element analysis is measured by X-ray fluorescence spectrometry (XRF), wherein the instrument used is Japanese Rigaku "ZSX primus" type X-ray fluorescence spectrometer.
2. The activity is evaluated on a microreactor apparatus sold by Huayang Company, Beijing. The feedstock oil is light diesel oil from Dagang. The evaluation condition is as follows: the catalyst is treated by 100% water steam at 800° C. for 4 h or 17 h; the load of the catalyst is 5 g; the reaction temperature is 460° C.; the reaction time is 70 s; and the catalyst/oil ratio is 3.2.

Example 1

25.6 g of triethyl phosphate is dissolved in 1000 g of n-hexane. 200 g of H-ZSM-5 molecular sieve sample is added to the solution under stirring, and allowed to react under stirring at reaction temperature of 100° C. under reaction pressure of 0.2 MPa for 60 min, followed by filtering and drying, and then calcined at 500° C. for 4 h. The molecular sieve sample thus obtained is labeled as Z-1. Subsequently, kaolin (45%), alumina gel (15%) and Z-1 (40%) are added into distilled water in the above proportion under slurrying, dried at 120° C. and calcined at 450° C. for 1 h, followed by crushing and screening The catalyst sample thus obtained is labeled as CZ-1, from which 20-40 mesh catalyst particles are tested for their activity in the microreactor. Tables 1-2 show the composition of the sample and the activity of this model catalyst tested in the microreactor.

Example 2

51.3 g of triethyl phosphate is dissolved in 800 g of n-pentane. 200 g of H-ZSM-5 molecular sieve sample is added to the solution under stirring, and allowed to react under stirring at reaction temperature of 120° C. under reaction pressure of 0.4 MPa for 120 min, followed by filtering and drying, and then calcined at 550° C. for 4 h. The molecular sieve sample thus obtained is labeled as Z-2. Subsequently, kaolin (45%), alumina gel (15%) and Z-2 (40%) are added into distilled water in fixed proportion under slurrying, dried at 120° C. and calcined at 450° C. for 1 h, followed by crushing and screening. The catalyst sample thus obtained is labeled as CZ-2, from which 20-40 mesh catalyst particles are tested for their activity in the microreactor. Tables 1-2 show the composition of the sample and the activity of this model catalyst tested in the microreactor.

Example 3

102.6 g of triethyl phosphate is dissolved in 1000 g of isopentane. 20 g of H-ZSM-5 molecular sieve sample is added to the solution under stirring, and allowed to react under stirring at reaction temperature of 140° C. under reaction pressure of 1 MPa for 200 min, followed by filtering and drying, and then calcined at 450° C. for 6 h. The molecular sieve sample thus obtained is labeled as Z-3. Subsequently, kaolin (45%), alumina gel (15%) and Z-3 (40%) are added into distilled water in fixed proportion under slurrying, dried at 120° C. and calcined at 450° C. for 1 h, followed by crushing and screening. The catalyst sample thus obtained is labeled as CZ-3, from which 20-40 mesh catalyst particles are tested for their activity in the microreactor. Tables 1-2 show the composition of the sample and the activity of this model catalyst tested in the microreactor.

Example 4

16.2 g of trimethyl phosphite is dissolved in 800 g of isopentane. 200 g of H-ZSM-5 molecular sieve sample is added to the solution under stirring, and allowed to react under stirring at reaction temperature of 120° C. under reaction pressure of 0.4 MPa for 60 min, followed by filtering and drying, and then calcined at 450° C. for 6 h. The molecular sieve sample thus obtained is labeled as Z-4. Subsequently, kaolin (45%), alumina gel (15%) and Z-4 (40%) are added into distilled water in fixed proportion under slurrying, dried at 120° C. and calcined at 450° C. for 1 h, followed by crushing and screening. The catalyst sample thus obtained is labeled as CZ-4, from which 20-40 mesh catalyst particles are tested for their activity in the microreactor. Tables 1-2 show the composition of the sample and the activity of this model catalyst tested in the microreactor.

Example 5

32.4 g of trimethyl phosphite is dissolved in 500 g of n-hexane. 200 g of ZSM-5 molecular sieve sample is added to the solution under stirring, and allowed to react under stirring at reaction temperature of 120° C. under reaction pressure of 0.4 MPa for 60 min, followed by filtering and drying, and then calcined at 600° C. for 2 h. The molecular sieve sample thus obtained is labeled as Z-5. Subsequently, kaolin (45%), alumina gel (15%) and Z-5 (40%) are added into distilled water in fixed proportion under slurrying, dried at 120° C. and calcined at 450° C. for 1 h, followed by crushing and screening. The catalyst sample thus obtained is labeled as CZ-5, from which 20-40 mesh catalyst particles are tested for their activity in the microreactor. Tables 1-2 show the composition of the sample and the activity of this model catalyst tested in the microreactor.

Example 6

32.4 g of trimethyl phosphite and 51.3 g of triethyl phosphate are dissolved in 500 g of n-pentane. 200 g of H-ZSM-5 molecular sieve sample is added to the solution under stirring, and allowed to react under stirring at reaction temperature of 180° C. under reaction pressure of 1.0 MPa for 30 min, followed by filtering and drying, and then calcined at 700° C. for 2 h. The molecular sieve sample thus obtained is labeled as Z-6. Subsequently, kaolin (45%), alumina gel (15%) and Z-6 (40%) are added into distilled water in fixed proportion under slurrying, dried at 120° C. and calcined at 450° C. for 1 h, followed by crushing and screening. The catalyst sample thus obtained is labeled as CZ-6, from which 20-40 mesh catalyst particles are tested for their activity in the microreactor. Tables 1-2 show the composition of the sample and the activity of this model catalyst tested in the microreactor.

Example 7

23.4 g of triethyl phosphite is dissolved in 1000 g of n-hexane. 200 g of H-ZSM-5 molecular sieve sample is added to the solution under stirring, and allowed to react under stirring at reaction temperature of 160° C. under reaction pressure of 1.2 MPa for 30 min, followed by filtering and drying, and then calcined at 300° C. for 8 h. The molecular sieve sample thus obtained is labeled as Z-7. Subsequently, kaolin (45%), alumina gel (15%) and Z-7 (40%) are added into distilled water in fixed proportion under slurrying, dried at 120° C. and calcined at 450° C. for 1 h, followed by crushing and screening. The catalyst sample thus obtained is labeled as CZ-7, from which 20-40 mesh catalyst particles are tested for their activity in the microreactor. Tables 1-2 show the composition of the sample and the activity of this model catalyst tested in the microreactor.

Example 8

46.8 g of triethyl phosphite is dissolved in 400 g of isopentane. 200 g of H-ZSM-5 molecular sieve sample is added to the solution under stirring, and allowed to react under stirring at reaction temperature of 200° C. under reaction pressure of 1.0 MPa for 60 min, followed by filtering and drying, and then calcined at 450° C. for 6 h. The molecular sieve sample thus obtained is labeled as Z-8. Subsequently, kaolin (45%), alumina gel (15%) and Z-8 (40%) are added into distilled water in fixed proportion under slurrying, dried at 120° C. and calcined at 450° C. for 1 h, followed by crushing and screening. The catalyst sample thus obtained is labeled as CZ-8, from which 20-40 mesh catalyst particles are tested for their activity in the microreactor. Tables 1-2 show the composition of the sample and the activity of this model catalyst tested in the microreactor.

Example 9

35.1 g of triethyl phosphite and 32.4 g of trimethyl phosphite are dissolved in 800 g of n-pentane. 200 g of H-ZSM-5 molecular sieve sample is added to the solution under stirring, and allowed to react under stirring at reaction temperature of 160° C. under reaction pressure of 0.8 MPa for 120 min, followed by filtering and drying, and then calcined at 500° C. for 6 h. The molecular sieve sample thus obtained is labeled as Z-9. Subsequently, kaolin (45%), alumina gel (15%) and Z-9 (40%) are added into distilled water in fixed proportion under slurrying, dried at 120° C. and calcined at 450° C. for 1 h, followed by crushing and screening. The catalyst sample thus obtained is labeled as CZ-9, from which 20-40 mesh catalyst particles are tested for their activity in the microreactor. Tables 1-2 show the composition of the sample and the activity of this model catalyst tested in the microreactor.

Example 10

1.89 g of NaCl is dissolved in 200 g of distilled water. 50 g of Z-1 molecular sieve sample is added to the solution under stirring, and allowed to react under stirring at reaction temperature of 70° C. for 60 min, followed by filtering and drying. The sodium contaminated molecular sieve sample thus obtained is labeled as N-1. Subsequently, kaolin (45%), alumina gel (15%) and N-1 (40%) are added into distilled water in fixed proportion under slurrying, dried at 120° C. and calcined at 450° C. for 1 h, followed by crushing and screening. The catalyst sample thus obtained is labeled as CN-1, from which 20-40 mesh catalyst particles are tested for their activity in the microreactor. Tables 1-2 show the composition of the sample and the activity of this model catalyst tested in the microreactor.

Example 11

4.73 g of NaCl is dissolved in 200 g of distilled water. 50 g of Z-2 molecular sieve sample is added to the solution under stirring, and allowed to react under stirring at reaction temperature of 70° C. for 60 min, followed by filtering and drying. The sodium contaminated molecular sieve sample thus obtained is labeled as N-2. Subsequently, kaolin (45%), alumina gel (15%) and N-1 (40%) are added into distilled water in fixed proportion under slurrying, dried at 120° C. and calcined at 450° C. for 1 h, followed by crushing and screening. The catalyst sample thus obtained is labeled as CN-2, from which 20-40 mesh catalyst particles are tested for their activity in the microreactor. Tables 1-2 show the composition of the sample and the activity of this model catalyst tested in the microreactor.

Example 12

14.18 g of NaCl is dissolved in 200 g of distilled water. 50 g of Z-3 molecular sieve sample is added to the solution under stirring, and allowed to react under stirring at reaction temperature of 70° C. for 60 min, followed by filtering and drying. The sodium contaminated molecular sieve sample thus obtained is labeled as N-3. Subsequently, kaolin (45%), alumina gel (15%) and N-3 (40%) are added into distilled water in fixed proportion under slurrying, dried at 120° C. and calcined at 450° C. for 1 h, followed by crushing and screening. The catalyst sample thus obtained is labeled as CN-3, from which 20-40 mesh catalyst particles are tested for their activity in the microreactor. Tables 1-2 show the composition of the sample and the activity of this model catalyst tested in the microreactor.

Example 13

1.89 g of NaCl is dissolved in 200 g of distilled water. 50 g of Z-4 molecular sieve sample is added to the solution under stirring, and allowed to react under stirring at reaction temperature of 70° C. for 60 min, followed by filtering and drying. The sodium contaminated molecular sieve sample thus obtained is labeled as N-4. Subsequently, kaolin (45%), alumina gel (15%) and N-4 (40%) are added into distilled water in fixed proportion under slurrying, dried at 120° C. and calcined at 450° C. for 1 h, followed by crushing and screening. The catalyst sample thus obtained is labeled as CN-4, from which 20-40 mesh catalyst particles are tested for their activity in the microreactor. Tables 1-2 show the composition of the sample and the activity of this model catalyst tested in the microreactor.

Example 14

4.73 g of NaCl is dissolved in 200 g of distilled water. 50 g of Z-5 molecular sieve sample is added to the solution under stirring, and allowed to react under stirring at reaction temperature of 70° C. for 60 min, followed by filtering and drying. The sodium contaminated molecular sieve sample thus obtained is labeled as N-5. Subsequently, kaolin (45%), alumina gel (15%) and N-5 (40%) are added into distilled water in fixed proportion under slurrying, dried at 120° C. and calcined at 450° C. for 1 h, followed by crushing and screening. The catalyst sample thus obtained is labeled as CN-5, from which 20-40 mesh catalyst particles are tested for their activity in the microreactor. Tables 1-2 show the composition of the sample and the activity of this model catalyst tested in the microreactor.

Example 15

14.18 g of NaCl is dissolved in 200 g of distilled water. 50 g of Z-6 molecular sieve sample is added to the solution under stirring, and allowed to react under stirring at reaction temperature of 70° C. for 60 min, followed by filtering and drying. The sodium contaminated molecular sieve sample thus obtained is labeled as N-6. Subsequently, kaolin (45%), alumina gel (15%) and N-6 (40%) are added into distilled water in fixed proportion under slurrying, dried at 120° C. and calcined at 450° C. for 1 h, followed by crushing and screening. The catalyst sample thus obtained is labeled as CN-6, from which 20-40 mesh catalyst particles are tested for their activity in the microreactor. Tables 1-2 show the composition of the sample and the activity of this model catalyst tested in the microreactor.

Example 16

1.89 g of NaCl is dissolved in 200 g of distilled water. 50 g of Z-7 molecular sieve sample is added to the solution under stirring, and allowed to react under stirring at reaction temperature of 70° C. for 60 min, followed by filtering and drying. The sodium contaminated molecular sieve sample thus obtained is labeled as N-7. Subsequently, kaolin (45%), alumina gel (15%) and N-7 (40%) are added into distilled water in fixed proportion under slurrying, dried at 120° C. and calcined at 450° C. for 1 h, followed by crushing and screening. The catalyst sample thus obtained is labeled as CN-7, from which 20-40 mesh catalyst particles are tested for their activity in the microreactor. Tables 1-2 show the composition of the sample and the activity of this model catalyst tested in the microreactor.

Example 17

4.73 g of NaCl is dissolved in 200 g of distilled water. 50 g of Z-8 molecular sieve sample is added to the solution under stirring, and allowed to react under stirring at reaction temperature of 70° C. for 60 min, followed by filtering and drying. The sodium contaminated molecular sieve sample thus obtained is labeled as N-8. Subsequently, kaolin (45%), alumina gel (15%) and N-8 (40%) are added into distilled water in fixed proportion under slurrying, dried at 120° C. and calcined at 450° C. for 1 h, followed by crushing and screening. The catalyst sample thus obtained is labeled as CN-8, from which 20-40 mesh catalyst particles are tested for their activity in the microreactor. Tables 1-2 show the composition of the sample and the activity of this model catalyst tested in the microreactor.

Example 18

14.18 g of NaCl is dissolved in 200 g of distilled water. 50 g of Z-9 molecular sieve sample is added to the solution under stirring, and allowed to react under stirring at reaction temperature of 70° C. for 60 min, followed by filtering and drying. The sodium contaminated molecular sieve sample thus obtained is labeled as N-9. Subsequently, kaolin (45%), alumina gel (15%) and N-9 (40%) are added into distilled water in fixed proportion under slurrying, dried at 120° C. and calcined at 450° C. for 1 h, followed by crushing and screening. The catalyst sample thus obtained is labeled as CN-9, from which 20-40 mesh catalyst particles are tested for their activity in the microreactor. Tables 1-2 show the composition of the sample and the activity of this model catalyst tested in the microreactor.

Comparative Example 1

37.2 g of $(NH_4)_2HPO_4$ is dissolved in 800 g of distilled water. 250 g of H-ZSM-5 molecular sieve is added to the solution under stirring, and pH value is adjusted to 3. The mixture is allowed to react under stirring at reaction temperature of 90° C. for 120 min, followed by filtering and drying, and then calcined at 550° C. for 4 h. The molecular sieve sample thus obtained is labeled as D-1. Subsequently, kaolin, alumina gel and D-1 (40%) are added into distilled water in fixed proportion under slurrying, dried at 120° C. and calcined at 450° C. for 1 h, followed by crushing and screening. The catalyst sample thus obtained is labeled as CD-1, from which 20-40 mesh catalyst particles are tested for their activity in the microreactor. Tables 1-2 show the composition of the sample and the activity of this model catalyst tested in the microreactor.

Comparative Example 2

37.2 g of $(NH_4)_2HPO_4$ is dissolved in 800 g of distilled water. 250 g of H-ZSM-5 molecular sieve is added to the solution under stirring, and pH value is adjusted to 3. The mixture is allowed to react under stirring at reaction temperature of 30° C. under reaction pressure of 0.4 MPa for 120 min, followed by filtering and drying, and then calcined at 550° C. for 4 h. The molecular sieve sample thus obtained is labeled as D-2. Subsequently, kaolin (45%), alumina gel (15%) and D-2 (40%) are added into distilled water in fixed proportion under slurrying, dried at 120° C. and calcined at 450° C. for 1 h, followed by crushing and screening. The catalyst sample thus obtained is labeled as CD-2, from which 20-40 mesh catalyst particles are tested for their activity in the microreactor. Tables 1-2 show the composition of the sample and the activity of this model catalyst tested in the microreactor.

Comparative Example 3

37.2 g of $(NH_4)_2HPO_4$ and 200 g of H-ZSM-5 molecular sieve are mechanically mixed until homogeneous and then calcined at 550° C. for 4 h. The molecular sieve sample thus obtained is labeled as D-3. Subsequently, kaolin (45%), alumina gel (15%) and D-3 (40%) are added into distilled water in fixed proportion under slurrying, dried at 120° C. and calcined at 450° C. for 1 h, followed by crushing and screening. The catalyst sample thus obtained is labeled as CD-3, from which 20-40 mesh catalyst particles are tested for their activity in the microreactor. Tables 1-2 show the composition of the sample and the activity of this model catalyst tested in the microreactor.

Comparative Example 4

1.89 g of NaCl is dissolved in 200 g of distilled water. 50 g of H-ZSM-5 molecular sieve sample is added to the solution under stirring, and allowed to react under stirring at reaction temperature of 70° C. for 60 min, followed by filtering and drying. The sodium contaminated molecular sieve sample thus obtained is labeled as NH-1. Subsequently, kaolin (45%), alumina gel (15%) and NH-1 (40%) are added into distilled water in fixed proportion under slurrying, dried at 120° C. and calcined at 450° C. for 1 h, followed by crushing and screening. The catalyst sample thus obtained is labeled as CNH-1, from which 20-40 mesh catalyst particles are tested for their activity in the microreactor. Tables 1-2 show the composition of the sample and the activity of this model catalyst tested in the microreactor.

Comparative Example 5

4.73 g of NaCl is dissolved in 200 g of distilled water. 50 g of H-ZSM-5 molecular sieve sample is added to the solution under stirring, and allowed to react under stirring at reaction temperature of 70° C. for 60 min, followed by filtering and drying. The sodium contaminated molecular sieve sample thus obtained is labeled as NH-2. Subsequently, kaolin (45%), alumina gel (15%) and NH-2 (40%) are added into distilled water in fixed proportion under slurrying, dried at 120° C. and calcined at 450° C. for 1 h, followed by crushing and screening. The catalyst sample thus obtained is labeled as CNH-2, from which 20-40 mesh catalyst particles are tested for their activity in the microreactor. Tables 1-2 show the composition of the sample and the activity of this model catalyst tested in the microreactor.

Comparative Example 6

14.18 g of NaCl is dissolved in 200 g of distilled water. 50 g of H-ZSM-5 molecular sieve sample is added to the solution under stirring, and allowed to react under stirring at reaction temperature of 70° C. for 60 min, followed by filtering and drying. The sodium contaminated molecular sieve sample thus obtained is labeled as NH-3. Subsequently, kaolin (45%), alumina gel (15%) and NH-3 (40%) are added into distilled water in fixed proportion under slurrying, dried at 120° C. and calcined at 450° C. for 1 h, followed by crushing and screening. The catalyst sample thus obtained is labeled as CNH-3, from which 20-40 mesh catalyst particles are tested for their activity in the microreactor. Tables 1-2 show the composition of the sample and the activity of this model catalyst tested in the microreactor.

Comparative Example 7

4.73 g of NaCl is dissolved in 200 g of distilled water. 50 g of D-1 molecular sieve sample is added to the solution under stirring, and allowed to react under stirring at reaction temperature of 70° C. for 60 min, followed by filtering and drying. The sodium contaminated molecular sieve sample thus obtained is labeled as ND-1. Subsequently, kaolin (45%), alumina gel (15%) and ND-1 (40%) are added into distilled water in fixed proportion under slurrying, dried at 120° C. and calcined at 450° C. for 1 h, followed by crushing and screening. The catalyst sample thus obtained is labeled as CND-1, from which 20-40 mesh catalyst particles are tested for their activity in the microreactor. Tables 1-2 show the composition of the sample and the activity of this model catalyst tested in the microreactor.

Comparative Example 8

4.73 g of NaCl is dissolved in 200 g of distilled water. 50 g of D-2 molecular sieve sample is added to the solution under stirring, and allowed to react under stirring at reaction temperature of 70° C. for 60 min, followed by filtering and drying. The sodium contaminated molecular sieve sample thus obtained is labeled as ND-2. Subsequently, kaolin (45%), alumina gel (15%) and ND-2 (40%) are added into distilled water in fixed proportion under slurrying, dried at 120° C. and calcined at 450° C. for 1 h, followed by crushing and screening. The catalyst sample thus obtained is labeled as CND-2, from which 20-40 mesh catalyst particles are tested for their activity in the microreactor. Tables 1-2 show the composition of the sample and the activity of this model catalyst tested in the microreactor.

Comparative Example 9

4.73 g of NaCl is dissolved in 200 g of distilled water. 50 g of D-3 molecular sieve sample is added to the solution under stirring, and allowed to react under stirring at reaction temperature of 70° C. for 60 min, followed by filtering and drying. The sodium contaminated molecular sieve sample thus obtained is labeled as ND-3. Subsequently, kaolin (45%), alumina gel (15%) and ND-3 (40%) are added into distilled water in fixed proportion under slurrying, dried at 120° C. and calcined at 450° C. for 1 h, followed by crushing and screening. The catalyst sample thus obtained is labeled as CND-3, from which 20-40 mesh catalyst particles are tested for their activity in the microreactor. Tables 1-2 show the composition of the sample and the activity of this model catalyst tested in the microreactor.

INDUSTRIAL UTILITY

The method of the present invention is able to efficiently increase the sodium-resisting contamination activity of molecular sieves, wherein the process is simple and accords with the current apparatus and procedure used for catalyst preparation. The molecular sieves thus prepared have good sodium-resisting contamination activity, and the model catalysts after sodium contamination exhibit high reservation of activity.

TABLE 1

Comparison of the sodium contamination performances of ZSM-5 molecular sieves

| Sample Ref. | $P_2O_5$ (wt %) | $Na_2O$ (wt %) |
|---|---|---|
| Z-1 | 1.9 | 0.02 |
| Z-2 | 2.4 | 0.02 |
| Z-3 | 3.2 | 0.02 |
| Z-4 | 2.0 | 0.02 |
| Z-5 | 2.9 | 0.02 |
| Z-6 | 3.8 | 0.02 |
| Z-7 | 1.7 | 0.02 |
| Z-8 | 2.8 | 0.02 |
| Z-9 | 3.0 | 0.02 |
| N-1 | 1.8 | 0.21 |
| N-2 | 2.4 | 0.53 |
| N-3 | 3.0 | 0.55 |
| N-4 | 1.8 | 0.22 |
| N-5 | 2.7 | 0.50 |
| N-6 | 3.5 | 0.56 |
| N-7 | 1.7 | 0.19 |
| N-8 | 2.8 | 0.54 |
| N-9 | 2.7 | 0.59 |
| D-1 | 1.5 | 0.02 |
| D-2 | 1.0 | 0.02 |
| D-3 | 9.7 | 0.02 |
| NH-1 | — | 0.56 |
| NH-2 | — | 1.02 |
| NH-3 | — | 2.33 |
| ND-1 | 0.3 | 1.17 |
| ND-2 | 0.5 | 1.53 |
| ND-3 | 0.2 | 1.62 |

TABLE 2

Activity performances of molecular sieve model catalysts in the microreactor

| Sample Ref. | Activity performance (%, After hydrothermal aging at 800° C. for 17 h) | Sample Ref. | Activity performance (%, After hydrothermal aging at 800° C. for 17 h) | *Activity reservation (%) |
|---|---|---|---|---|
| CZ-1 | 38 | CN-1 | 36 | 94.7 |
| CZ-2 | 39 | CN-2 | 37 | 94.9 |
| CZ-3 | 41 | CN-3 | 38 | 93.7 |
| CZ-4 | 39 | CN-4 | 36 | 92.3 |
| CZ-5 | 40 | CN-5 | 37 | 92.5 |
| CZ-6 | 42 | CN-6 | 40 | 95.2 |
| CZ-7 | 38 | CN-7 | 36 | 94.7 |
| CZ-8 | 40 | CN-8 | 37 | 92.5 |
| CZ-9 | 39 | CN-9 | 37 | 94.9 |
| CD-1 | 28 | CND-1 | 10 | 35.7 |
| CD-2 | 27 | CND-2 | 10 | 37.0 |
| CD-3 | 27 | CND-3 | 9 | 33.3 |

*Activity reservation (%) = CN/CZ × 100% or CND/CD × 100%

Table 1 shows comparison of the sodium contamination performances of the ZSM-5 molecular sieves prepared by the method in accordance with the present invention with those of the ZSM-5 and H-ZSM-5 molecular sieves modified by conventional methods. It can be seen from Table 1 that, when the ZSM-5 and H-ZSM-5 molecular sieves modified by conventional methods are subjected to the sodium contamination experiments, the $Na_2O$ contents in the molecular sieves are clearly higher than those in the ZSM-5 molecular sieves prepared by the method in accordance with the present invention. Therefore, the molecular sieves prepared by the method in accordance with the present invention is able to efficiently inhibit sodium ions from contaminating the molecular sieves.

Meanwhile, it can be seen from the activity data obtained in the microreactor showed in Table 2 that, when the ZSM-5 and H-ZSM-5 molecular sieves modified by conventional methods are subjected to the sodium contamination experiments, the activity performances of their model catalysts in the microreactor decrease sharply and the activity reservations are relatively low, whereas the model catalysts generally remain relatively high activity performances for the ZSM-5 molecular sieves prepared using the method in accordance with the present invention, that is, they possess better sodium-resisting contamination activity.

What we claim is:

1. A method for preparing molecular sieve comprising:
   contacting a molecular sieve with a phosphorus-containing organic solution;
   heating the phosphorus-containing organic solution comprising the molecular sieve at a reaction temperature of 70-200° C. under a reaction pressure of 0.2-1.2 MPa for 10-200 minutes; and filtering, drying and calcining the molecular sieve, so as to obtain a modified molecular sieve having improved sodium-contamination-resisting activity.

2. The method for preparing modified molecular sieve with improved sodium-contamination-resisting activity according to claim 1, wherein, the molecular sieve is HZSM-5 molecular sieve.

3. The method for preparing modified molecular sieve with improved sodium-contamination-resisting activity according to claim 1, wherein, the phosphorus-containing organic solution comprises a phosphorus-containing compound that is one or more of triethyl phosphate, trimethyl phosphite, triethyl phosphite, tributyl phosphate, triphenyl phosphate, phosphorus trichloride, phosphorus tribromide, phosphorus pentachloride and di-n-butyl phosphite.

4. The method for preparing modified molecular sieve with improved sodium-contamination-resisting activity according to claim 1, having an organic solvent in the phosphorus-containing organic solution which is one of n-hexane, n-pentane, isopentane, cyclopentane, ethyl ether, ethanol, acetone, toluene and carbon tetrachloride.

5. The method for preparing modified molecular sieve with improved sodium-contamination-resisting activity according to claim 1, having a weight ratio of the phosphorus-containing organic solution to the molecular sieve in the range from 2:1 to 6:1.

6. The method for preparing modified molecular sieve with improved sodium-contamination-resisting activity according to claim 1, wherein, the reaction temperature is in the range of 90-160° C.

7. The method for preparing modified molecular sieve with improved sodium-contamination-resisting activity according to claim 1, wherein, the reaction pressure is in the range of 0.2-0.8 MPa.

8. The method for preparing modified molecular sieve with improved sodium-contamination-resisting activity according to claim 1, wherein, the calcining temperature is in the range of 200-800° C.

9. The method of claim 1, wherein the modified molecular sieve contains less than about 0.6 wt. % $Na_2O$ after contacting the modified molecular sieve with aqueous sodium chloride solution, filtering, and drying.

* * * * *